US008390447B2

(12) United States Patent  (10) Patent No.: US 8,390,447 B2
Guard  (45) Date of Patent: Mar. 5, 2013

(54) ELECTRONIC TIME DATA SYSTEM

(75) Inventor: Tony M. Guard, Union, KY (US)

(73) Assignee: Gravity, Incorporated, Union, KY (US)

( * ) Notice: Subject to any disclaimer, the term of this patent is extended or adjusted under 35 U.S.C. 154(b) by 508 days.

(21) Appl. No.: 12/713,068

(22) Filed: Feb. 25, 2010

(65) Prior Publication Data

US 2010/0214098 A1  Aug. 26, 2010

Related U.S. Application Data

(60) Provisional application No. 61/208,612, filed on Feb. 26, 2009.

(51) Int. Cl.
*G08B 21/00* (2006.01)
(52) U.S. Cl. ............... 340/540; 340/309.16; 340/691.6; 434/362
(58) Field of Classification Search .............. 340/540, 340/539.11, 309.16, 691.4–691.6, 692; 434/245, 434/308, 322, 327, 335, 362
See application file for complete search history.

(56) References Cited

U.S. PATENT DOCUMENTS

| 6,356,956 | B1* | 3/2002 | Deo et al. ............. 719/318 |
| 7,052,277 | B2* | 5/2006 | Kellman ............... 434/322 |
| 2003/0180699 | A1* | 9/2003 | Resor .................. 434/322 |
| 2009/0111084 | A1* | 4/2009 | Mccarty ............... 434/327 |
| 2009/0197237 | A1* | 8/2009 | Couch et al. ......... 434/362 |

* cited by examiner

*Primary Examiner* — Thomas Mullen
(74) *Attorney, Agent, or Firm* — Wood, Herron & Evans, LLP

(57) ABSTRACT

Data in the form of discrete learnable objects, is automatically retrieved at time intervals and fed to a user by an electronic time data device based on options such as subject, alert and time interval of 60 minutes or less. Preceding or with the feeding of a data object, an alert is outputted, which is ceased by an input. Inputs such as answers to questions to test comprehension, can also be required. The system can evaluate the responses, and adaptively introduce a new subject when comprehension is demonstrated, and repeat data objects for which comprehension is not demonstrated. The interval, subject matter fed and other parameters can be controlled by the device, or remotely by a second device or administrator, and information representative of comprehension, marketing, and the like can be recorded and collected.

28 Claims, 12 Drawing Sheets

ELECTRONIC TIME DATA SYSTEM

This application claims the benefit of U.S. Provisional Patent Application Ser. No. 61/208,612, filed Feb. 26, 2009.

TECHNICAL FIELD

This invention relates generally to an electronic time data system and method, which, more particularly, in an active mode feeds data objects of pre-selected information to a user in succession at rapid, timed intervals, prompted by a sensory alert, to provide an effective learning experience.

BACKGROUND ART

U.S. Provisional Application No. 61/208,612, filed Feb. 26, 2009, is incorporated herein in its entirety by reference.

There are currently many handheld electronic devices with programs that feed information to the user via buttons/controls/display. Some of the items include calculators, phones, games, personal computers, and more. In each of these products the data is retrieved by the user through a retrieval process that involves action by the user, each time information is provided by the electronic device. However, these products fall short when the user needs a constant repetitive data feed situation (for instance, every hour or less throughout the day) for purposes of understanding or educating.

SUMMARY OF THE INVENTION

What is disclosed is an electronic system and program wherein data, in the form of discrete learnable objects, is continuously fed to a user by an electronic device based on preset options such as subject, alert and time interval based on 60 and preferably 30 minutes or less. The stored data within the electronic device and accessed by the program is divided into one or more subjects. The data is then automatically retrieved and displayed from the preset subject based on the preset time interval within the electronic device. As the data is retrieved, the user is continuously notified of the data object to be viewed by an alert outputted by the electronic device, based on the time interval setting, until the user takes action to stop the data feed or the user completes one or more processes within the program, which can be, for instance, providing a responsive input such as selecting answers to questions which test comprehension of the subject. This is a data system where the information is being pushed to the user in a rapid succession of data objects to educate the user on the stored data within time intervals of 60 or 30 minutes or less (e.g., the rapid succession and continuous feeding allows learning to take place based on repetition that can take place throughout the users day).

According to a preferred embodiment, the invention will feed data to a user comprising pre-selected information based on a pre-selected time interval for the purposes of educating the user. Some examples of subject matter of data objects can include, but are not limited to: 1) Bible verses with correlating categories such as Marriage, Children, Hope, and so on; 2) famous quotes with categories such as Einstein, Franklin, Reagan, and so on; 3) excerpts from famous books with categories featuring different chapters of the books; 4) study aid for tests, e.g., comprising information relating to tests for various subjects (SAT/ACT and so on); 5) data objects in the form of questions to the user and requiring responses, and analyzing or computing the responses in an adaptive process to determine a user's comprehension of the subject matter, and identify weak areas (low comprehension) and increases the rate of appearance of the weak areas within the data displayed to the user. For example, learning objects in those areas of lower comprehension will be fed to the user more than those of the areas of greater comprehension. The invention can also comprise a data collection capability to provide accuracy, time, and other trackable data features. Still further the invention can comprise: 6) collecting marketing data from users or consumers.

In another preferred embodiment, the Electronic Time Data System (ETDS) would be used and follow a process as follows; the data stored on the ETDS can either be preexisting or can be uploaded to the ETDS through a secondary device via data transfer. Once the user begins to interact with the ETDS, the user may be prompted to set the time interval rate at which to receive the respective data objects (e.g., at 30 minutes or less intervals), audible properties, display features, subject or other adjustable features (If they are not preset already). In another option, the user will access the ETDS with all settings predefined. Now that the users settings (timing intervals, alert, subject) are defined, the ETDS is in active mode and will begin sending data objects to the user. Each time new data, e.g., a new data object, is outputted or displayed for the user, the data will be preceded or accompanied by an alert outputted for notifying the user of new information. The user will then access and/or view/listen to the data object which simultaneously ceases or turns off the alert. Depending on the type of education process, the user may be required to respond to the data by making a recordable response. In this case, the ETDS will store all or pertinent responses for collection, accuracy, continued feeding, and other types educational related options (such as defining problem areas or strong areas). In one option, the user may be required to review an entire series of data (with an option for responses) multiple times because of requirements by pre-defined settings, continue reviewing until all responses are the correct response (showing comprehension), review data for a specified amount of time, and/or other trackable educational data features/settings, which may help define information that the user is having trouble understanding, e.g., lacking comprehension, and determine and implement a responsive approach, e.g. adaptively feed the data objects necessary for comprehending the subject, e.g., those areas in which the user is weak. Once the user has completed review and or responded to the data on the EDTS, the results from the stored data, based on the users use and/or responses can be uploaded to another device via data transfer for collection, storing and/or review by the educator.

In another preferred embodiment, the Electronic Time Data System (ETDS) would be used and follow a process as follows. The data stored on the ETDS can either be preexisting or can be uploaded to the ETDS through a secondary device via data transfer. Once the user begins to interact with the ETDS, the user may be prompted to set the time interval rate at which to receive the data objects, audible properties, display features, subject or other adjustable features (If they are not preset already). In another option, the user will access the ETDS with all settings predefined. Now that the user's settings are defined, the ETDS is in active mode and will begin sending data objects to the user. In one option, the data is sent to the user as the ETDS is prompted by a secondary device (the secondary device would control the timing of the displayed data and in one option may advance to the next data based on the detection of another secondary device). Each time new data is displayed for the user, the data will be preceded or accompanied by an alert outputted in a manner for notifying the user of new information. The user will then access and/or view the data which simultaneously turns off the alert. Depending on the type of education process, the user may be required to respond to the data by making a recordable response, which can be for example, a selection responsive to a prompt. In this case, the ETDS will store all responses for collection and accuracy. Once the user has completed review and or responded to the data on the EDTS, the results from the stored data, based on the users use and/or responses can be uploaded to another device via data transfer for collection, storing and/or review.

In still another preferred embodiment the Electronic Time Data System (ETDS), would be used and follow a process as follows; The data stored on the ETDS can either be preexisting or can be uploaded to the ETDS through a secondary device via data transfer. Once the user begins to interact with the ETDS, the user may be prompted to set the time interval rate at which to receive the data, audible properties, display features, subject and/or other adjustable features (If they are not preset already). In another option, the user will access the ETDS with all settings predefined (default). Now that the user's settings are defined, the ETDS is in active mode and will begin sending data to the user based on the predefined settings. Each time new data is displayed for the user, the data will be preceded or accompanied by an alert notifying the user of new information. The user will then access and/or view the data which simultaneously turns off the alert. The ETDS will continue to send data to the user until the user takes action to stop the ETDS from continuing. In one option, the user has the ability to store data on the ETDS in segments within the data storage of the ETDS for continued or further review. In the option of the user storing/marking data for specific displaying within the ETDS, the stored/marked data is then reviewed/displayed as a separate grouping of data within the ETDS (as in a favorites and/or memorization list). As the user is fed data on a continuous basis within a minimal time period, the user is more likely to retain said data for future use.

DETAILED DESCRIPTION OF THE INVENTION

Figure 1:
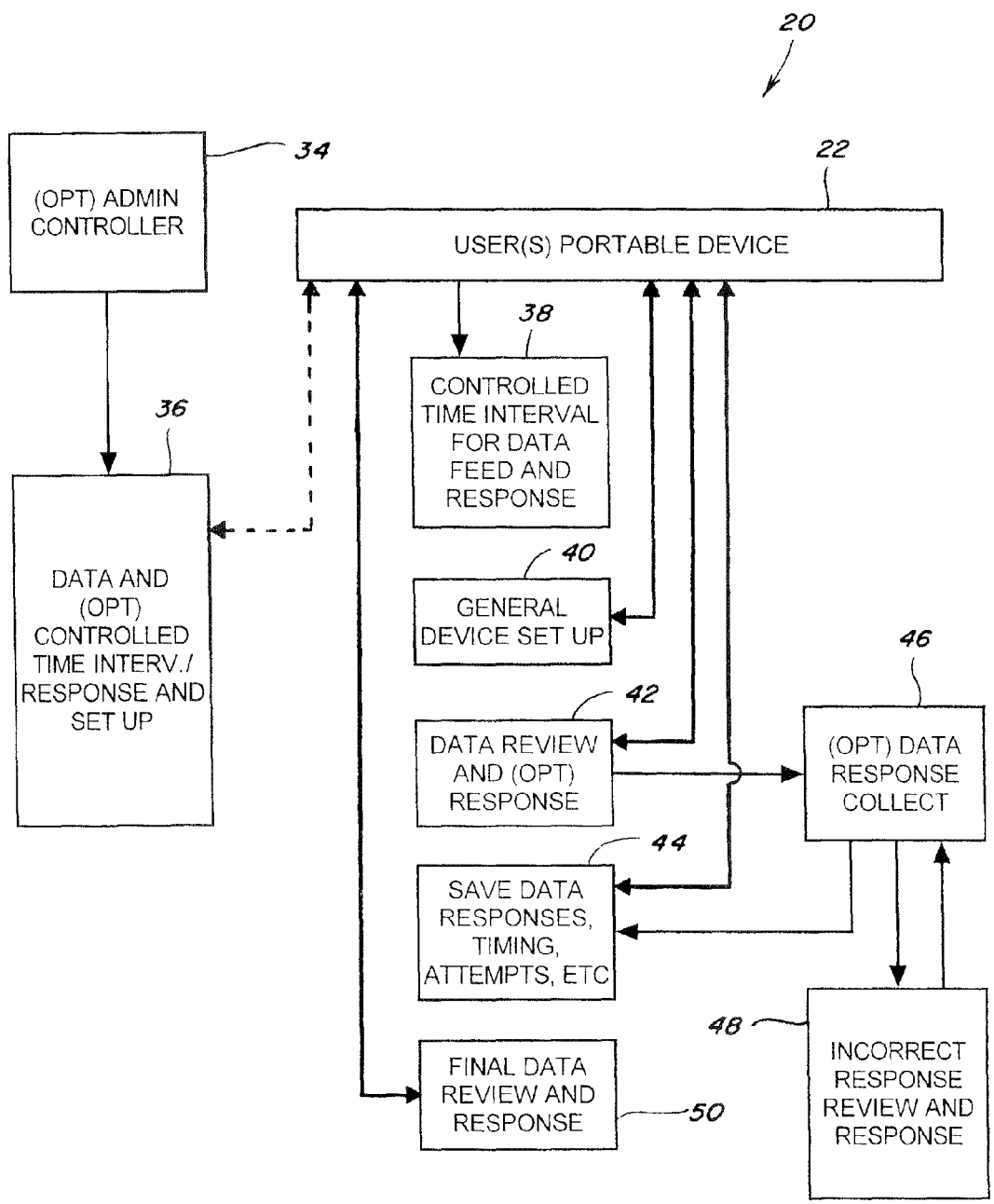
FIG. 1 is a high level flow diagram showing aspects of an electronic time data system according to the invention.

Referring now to the drawings, in FIGS. 1 through 12, aspects of an electronic time data system 20 constructed and operable according to the teachings of the present invention, and steps of a method of that invention, are shown. More particularly, in FIGS. 2 and 2A, an important aspect of system 20 is a hand held or portable programmable electronic device 22 for feeding or outputting learnable data or information to a user at regular intervals preceded or accompanied by an alert, a basic embodiment of which device depicted here includes a processor 24, which can be, for instance, a commercially available microcontroller; a memory 26, for instance a commercially available EPROM, flash EEPROM, or the like; at least one input 28, for instance, several user operable toggle switches 28A, 28B, 28C, and 28D, arranged around a center push button switch 28E; at least one output 30, here including a display device 30A such as an LCD, LED or plasma device, and an audio device 30B such as a piezoelectric device or speaker; and a power supply 32, all arranged in a compact, portable package. As will be illustrated, the processing requirements of processor 24 are relatively simple, and the memory requirements will depend on the amount of data to be stored, it being contemplated that, for at least some applications, e.g., learning of Bible verses or famous inspirational quotes, device 22 will be a low cost, disposable or rechargeable battery powered device containing just a few hundred or thousand data objects (e.g., verses or quotes).

Device 22 in a more complex embodiment can include a combined input/output, such as, but not limited to, a USB port or wireless radio, to enable communication with a second device, such as a computer, computer network, communications network, or the like, for purposes such as downloading additional data, uploading data such as information indicative of subject matter comprehension, marketing data, and the like. Alternatively, system 20 of the invention can be embodied in an application for a commercially available hand held device such as a cellular telephone; PDA (personal digital assistant); music/media device; tablet computer; netbook; or the like.

Figure 2:
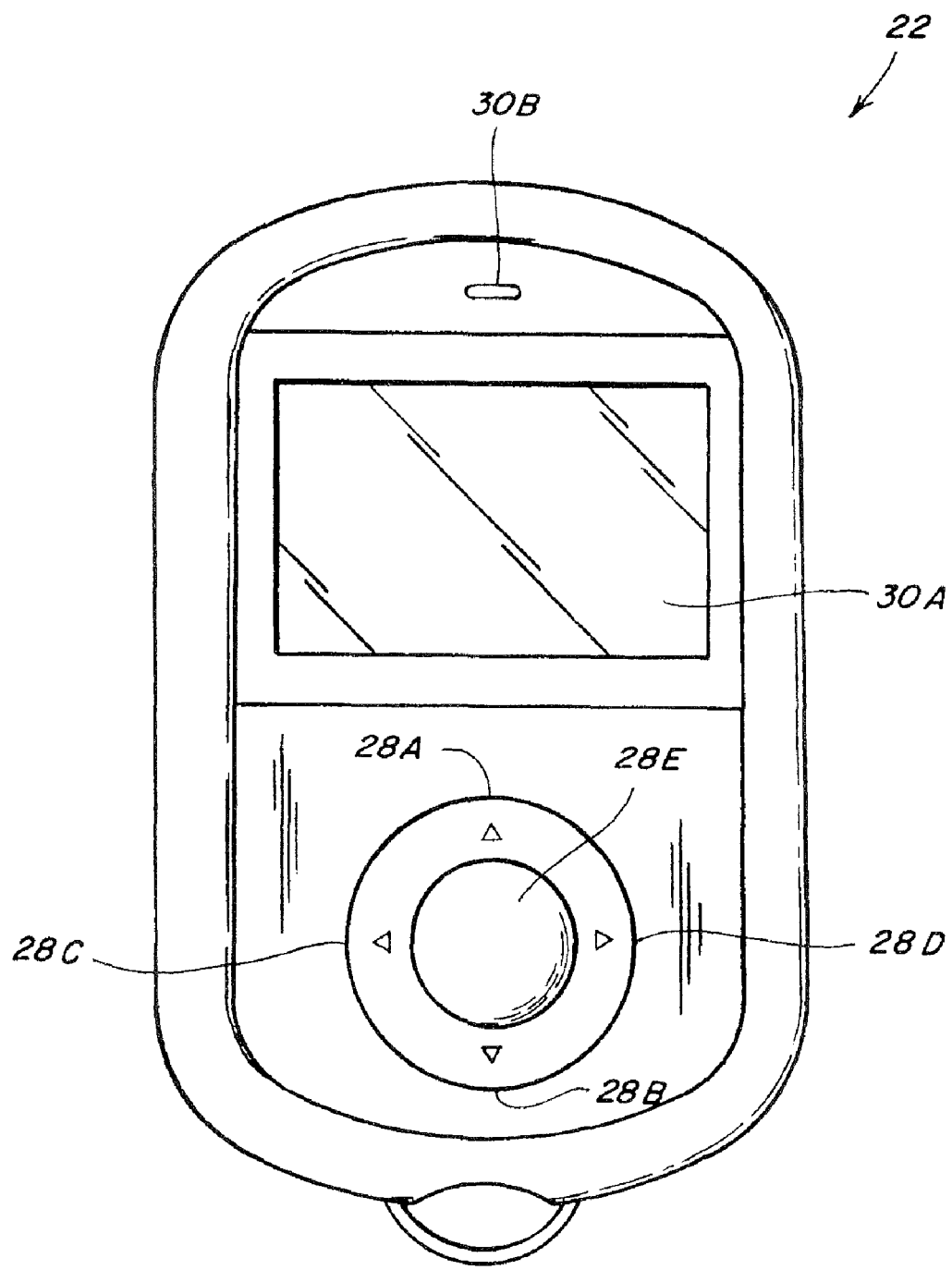
FIG. 2 is a front view of one embodiment of an electronic data storage device usable with the invention.
Figure 2A:
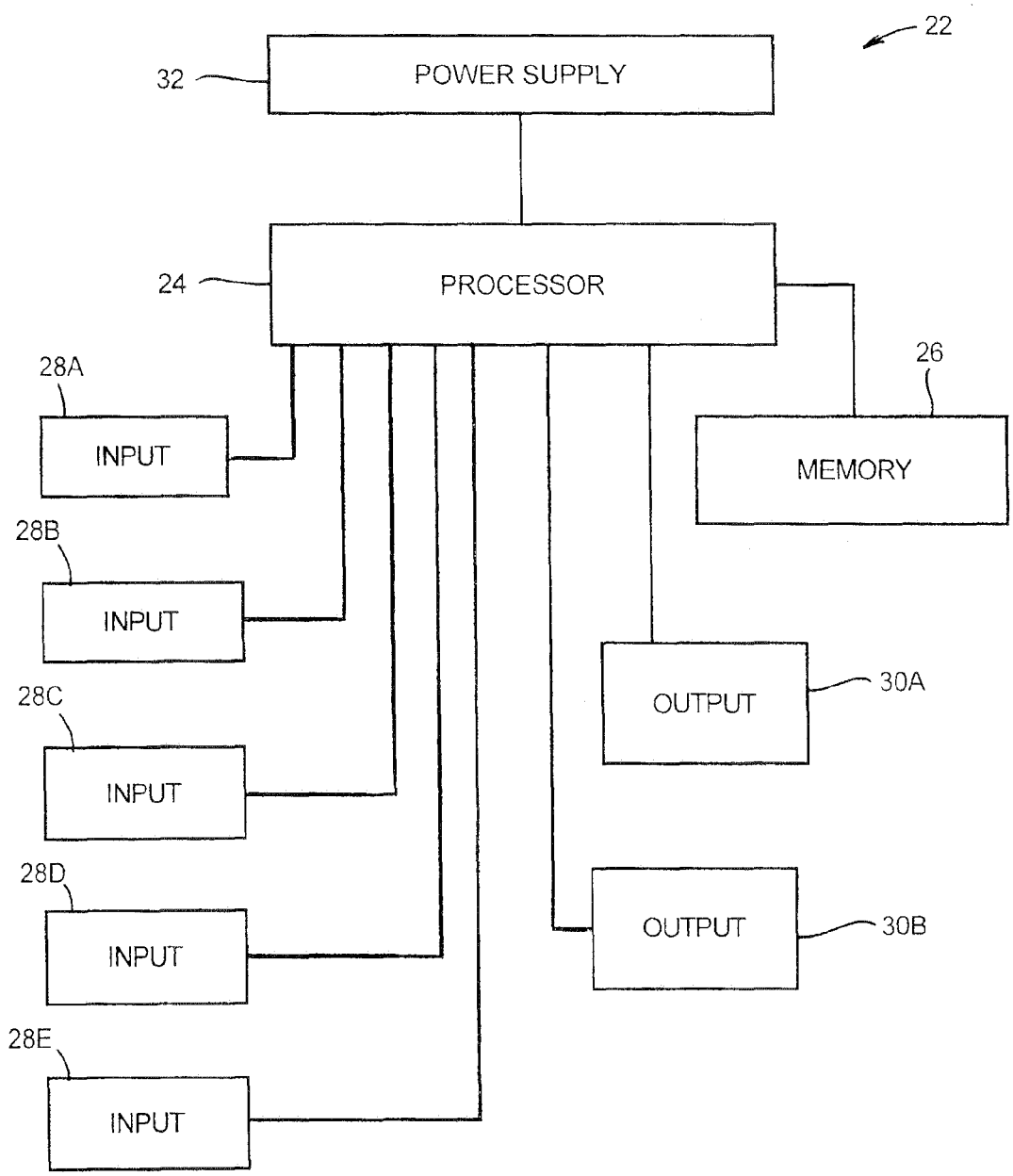
FIG. 2A is a system diagram of the device of FIG. 2.

Referring more particularly to FIG. 1, device 22 (preferably a handheld portable device for a user) of system 20 will be initially programmed and loaded with data via a suitable method such as a flash download or the like, as appropriate for the type of device used. This can be done in the well known manner in a mass production factory setting, or on a more individualized basis by an administrator, e.g., spiritual advisor, instructor, tutor, etc., using an optional system administration controller 34, e.g., a computer, via a USB, wireless or other suitable communication path. Some operating parameters that may be pre-programmed in this manner can include the data set or sets, e.g., subject matter category or categories; time interval, e.g., 60 minutes, 30 minutes, 15 minutes or less; user response(s) or manner of response required (if any), e.g., questions to be answered to demonstrate comprehension; and other set up parameters, e.g., manner of alerting user such as audible and/or visible alarm, as denoted by block 36. Device 22 when pre-programmed in this manner will then be ready for activation and use by a user, wherein the data in the form of the discrete data objects will be outputted or fed to the user at the pre-programmed or selected time intervals, for response if required, as denoted by block 38.

Alternatively, device 22 of system 20 can be configured and programmed to allow a user to selectively set up various operating parameters, using input or inputs 28A-E and output 30A, as denoted by block 40. Other features include the ability for device 22, and/or an administrator or second device, to review the data and optionally the inputted responses (if any), as denoted by block 42; and save data or information, e.g., the data responses, timing, attempts, etc., as denoted by block 44; and collect, e.g., upload, this data/information, as denoted by block 46, for review of incorrect responses, patterns, etc. demonstrating comprehension or lack of comprehension, recall, proficiency, strengths, weaknesses, etc.; and respond, e.g., re-output or feed the data for which the user is deficient, or download/output/feed new data if adequate comprehension/memory/proficiency is demonstrated, as denoted by block 48. Device 22 can also be programmed to allow final data review and response by the user, for instance, to allow gauging comprehension/proficiency thereof, identify strengths, weaknesses, etc., as denoted by block 50.

Some representative examples of subject matter of data objects can include, but are not limited to: 1) Bible verses with correlating categories such as Marriage, Children, Hope, and so on; 2) famous quotes with categories such as Einstein, Franklin, Reagan, and so on; 3) excerpts from famous books with categories featuring different chapters of the books; 4) study aid for tests, e.g., comprising information relating to tests for various subjects (SAT/ACT and so on).

Device 22 is configured and programmed to allow a user to select certain individual data objects as favorites, or for memorization, using a simple menu screen driven utility, as will be explained. Device 22 can also be configured to obtain feedback of desired parameters. For instance, some or all of the data objects can comprise questions to the user that require responses, which can be analyzed or computed in an adaptive process to determine a user's comprehension/memory/proficiency of the subject matter, and identify weak areas (low comprehension) and increases the rate of appearance of data objects relating to weak areas of comprehension, etc., within the subsequent data displayed to the user. For example, as a result, learning objects in those areas of lower comprehension will be fed to the user more often than those of the areas of greater comprehension. The invention can also comprise a data collection capability to provide accuracy, time, and other trackable data features. Still further, the collected data can comprise marketing data from users or consumers.

FIGS. 3 through 12 diagram portions of a preferred embodiment of the system architecture and steps of a method of the invention for a representative subject matter which is Judeo-Christian Bible verses, under a title "Life Discipler", including sample user interface displays and selectable set up and response options.

Figure 3:
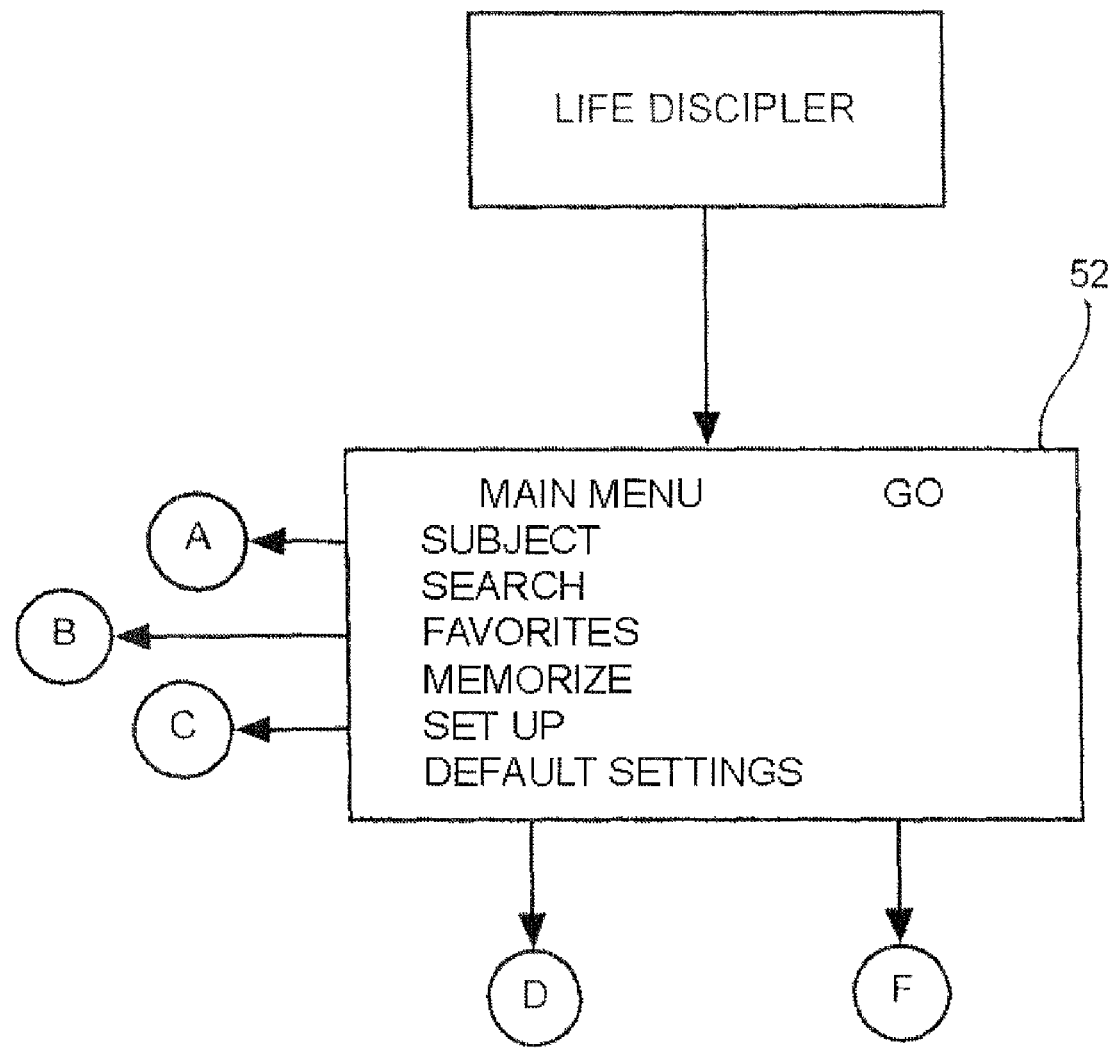
FIG. 3 is a portion of a high level flow diagram of steps of one embodiment of a method of the invention.

Referring in particular to FIG. 3, upon activation of device 22 (here achievable by depressing center push button input 28E for two seconds or other suitable manner) block 52 depicts a start or main menu screen showing user selectable options which will be displayed on the display device output 30A, including: SET UP; DEFAULT; MAIN MENU; FAVORITES; MEMORIZE; SUBJECT; SEARCH; and GO. Device 22 here is configured and programmed to allow navigation among the options using toggle switch inputs 28A-D, and to select an option using the center push button input 28E, which serves as an "enter" button for the selection, although a variety of other alternative configurations could also be used. As evident, a default set up can be selected, or device 22 can be custom set up using any of the available selections. When the GO option is selected, device 22 will commence automatically feeding the data objects at the prescribed intervals.

Figure 4:
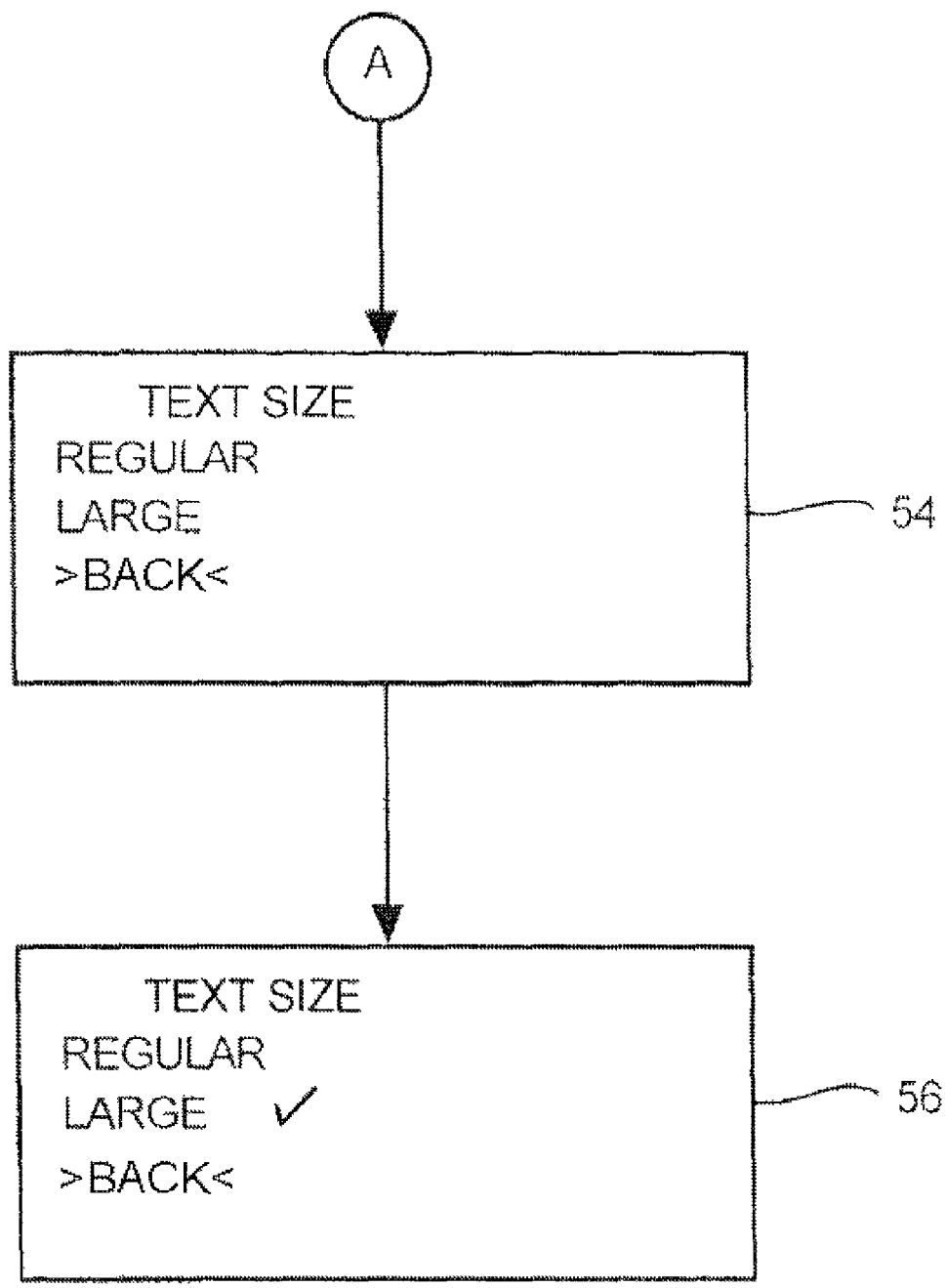
FIG. 4 is another portion of the flow diagram.

Following balloon A to FIG. 4, as an example of customizable setup options, when the TEXT SIZE option is selected, a new screen showing selectable text size options is displayed, as illustrated by block 54. Using the toggle button inputs 28A and 28B, either REGULAR or LARGE TEXT can be selected, as denoted by the check mark in block 56. The main menu screen is then reached by pushing the center push button input 28E for two seconds or selecting >BACK< to return to the previous screen.

Figure 5:
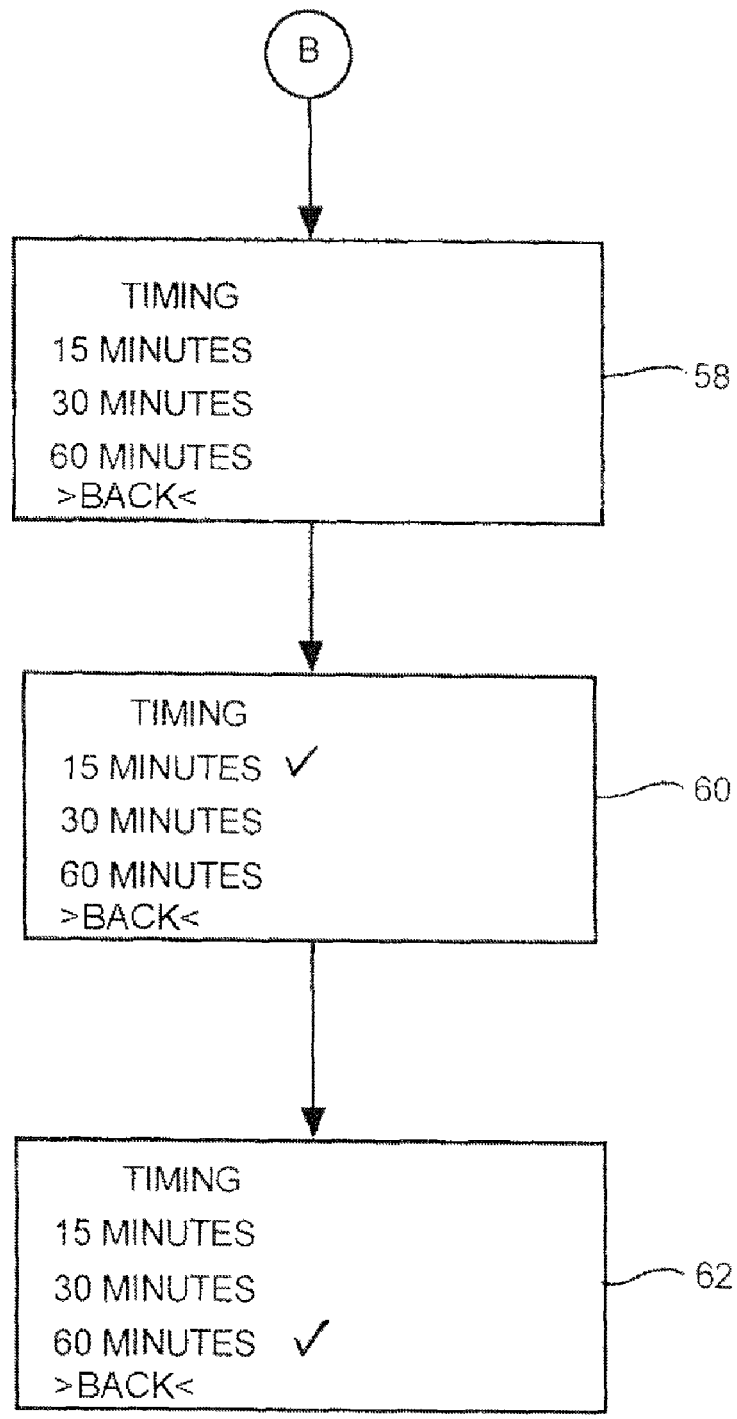
FIG. 5 is another portion of the flow diagram.

Returning to FIG. 3, following balloon B to FIG. 5, selection of the timing option displays a timing screen as denoted by block 58. Selectable options include 15 MINUTES, 30 MINUTES, 60 MINUTES and >BACK<. Using toggle button inputs 28A and 28B, the user can select any of the timing options, e.g., 15 MINUTES (block 60), 60 MINUTES (block 62), and select using the center push button input 28E. Pressing and holding the center push button input 28E again returns to the main menu screen of FIG. 3.

Figure 6:
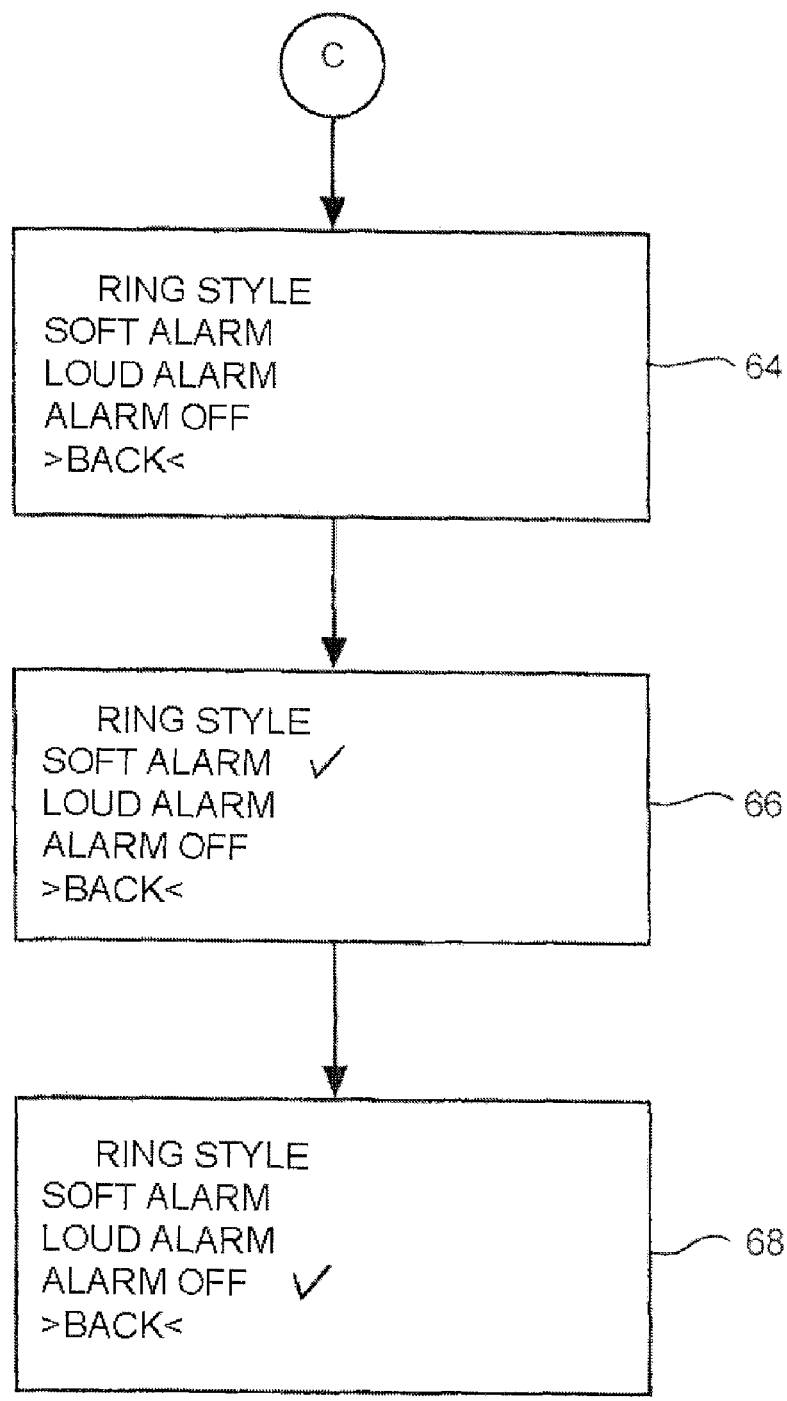
FIG. 6 is another portion of the flow diagram.

Following balloon C to FIG. 6, ring style can be selected, as denoted by block 64. Selectable options include SOFT ALARM; LOUD ALARM; ALARM OFF and >BACK<. Again, by scrolling with toggle button inputs 28A and 28B, any of the options can be selected, as denoted by the representative check marks in blocks 66 and 68.

Figure 7:
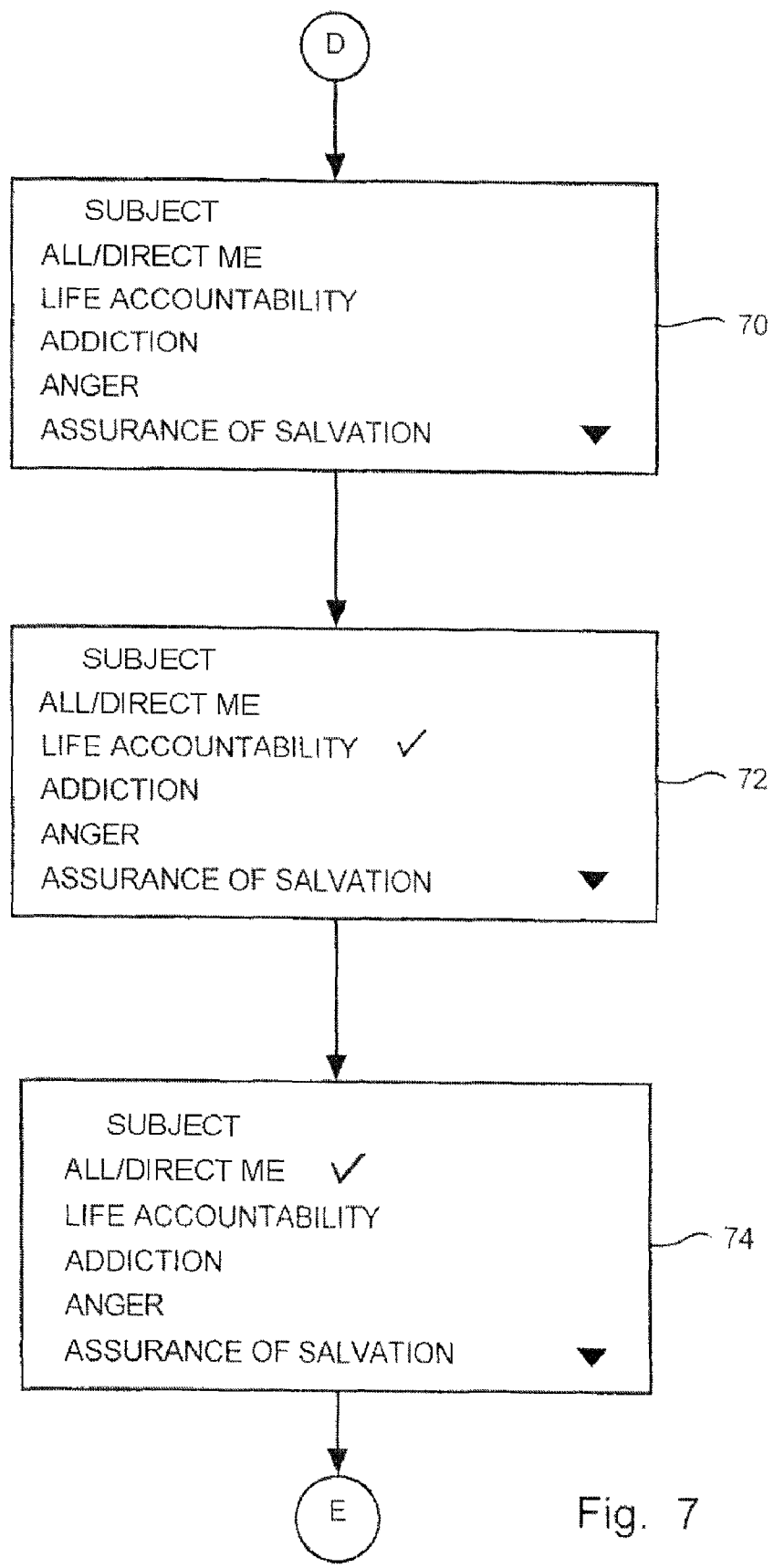
FIG. 7 is another portion of the flow diagram.

Returning to FIG. 3, following balloon D to FIG. 7, if multiple subject matter categories are provided, a category can be selected, as represented by the illustrated Christian Bible subject categories: ALL/DIRECT ME; LIFE ACCOUNTABILITY; ADDICTION; ANGER; and ASSURANCE OF SALVATION, as denoted in block 70. Scrolling with toggle button inputs 28A and 28B allows viewing of additional subjects and selection of a desired subject category using the center push button input 28E, as denoted by blocks 72 and 74. At this time, pushing button input 28E confirms the selection and the MAIN MENU is now displayed. At this time, the GO selection is confirmed by pressing button 28E and device 22 is ready to automatically feed or output the data objects for the selected category, at the prescribed time intervals.

Figure 8:
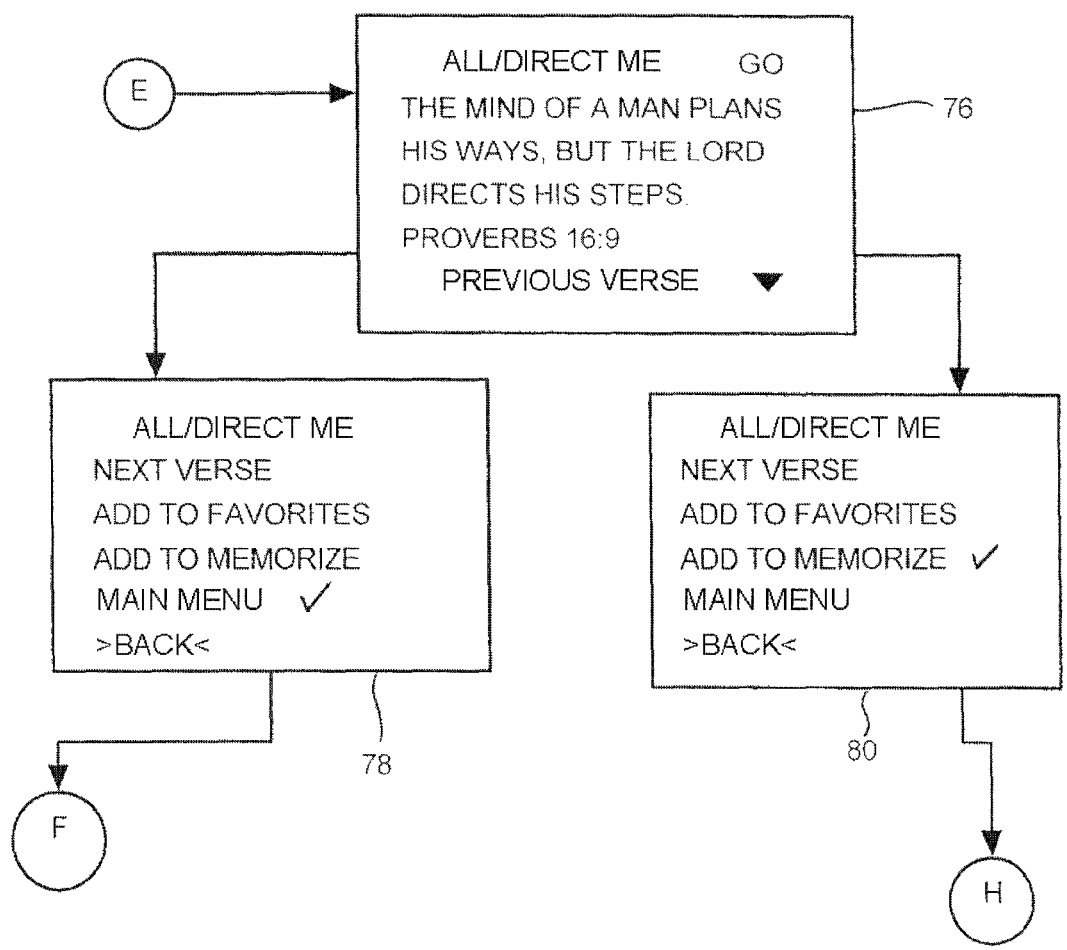
FIG. 8 is another portion of the flow diagram.
Figure 9:
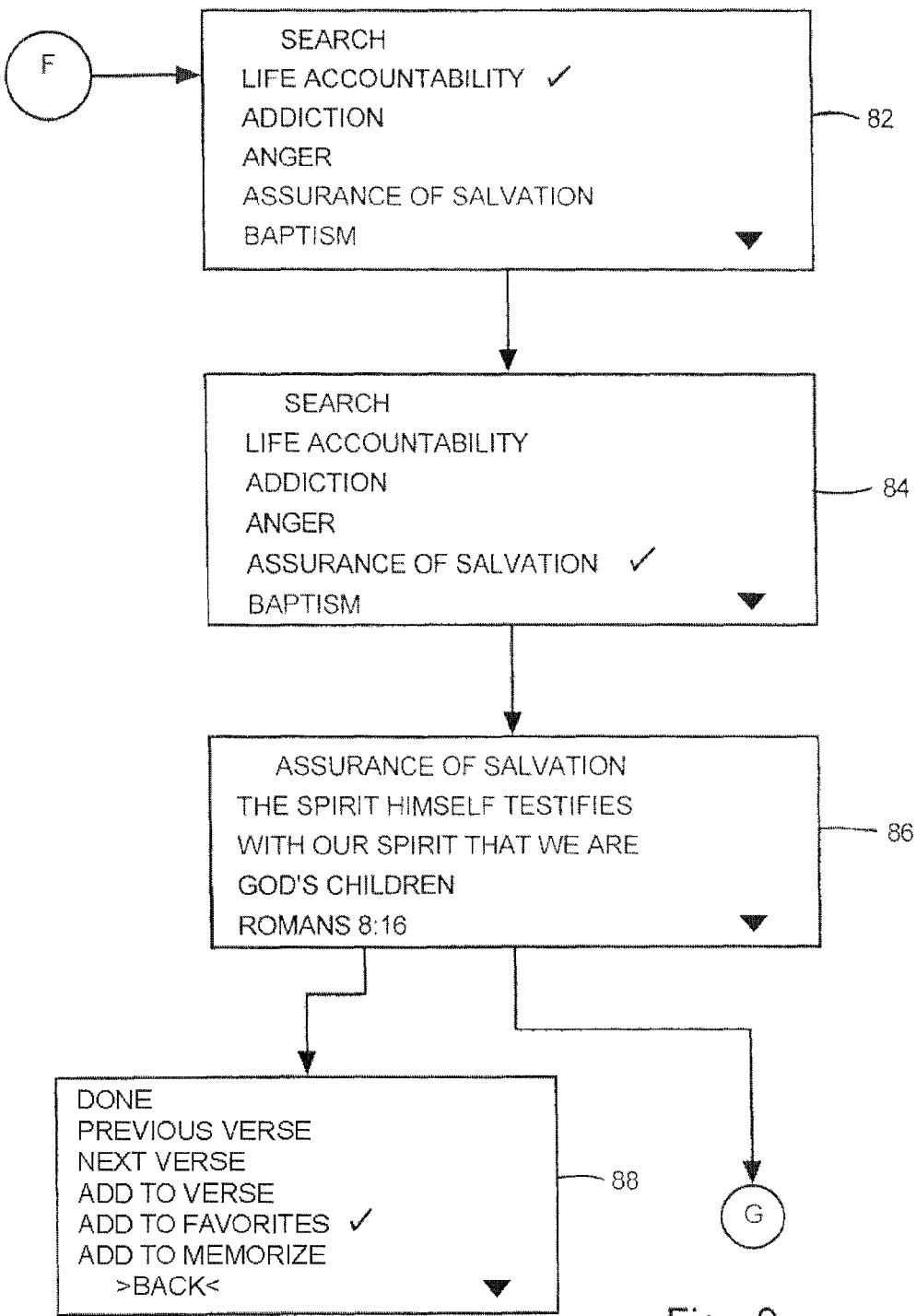
FIG. 9 is another portion of the flow diagram.

Following balloon E to FIG. 8, under the ALL/DIRECT ME subject category, a first data object is displayed, as illustrated in block 76, as follows: LEADERSHIP; THE MIND OF A MAN PLANS HIS WAYS, BUT THE LORD DIRECTS HIS STEPS; PROVERBS 16:9; PREVIOUS VERSE. Display of each data object will be preceded or accompanied by an alert, which, here, will be an audible signal or alarm, which will be ceased or turned off by an operator action or set amount of time, which can be, for instance, selecting the GO option, or pressing any of the buttons of inputs 28A-E. The user will now read the verse, and either take no further action, in which instance, the next verse will be automatically displayed at the designated time interval. The user can press the left toggle button input 28C to now display a preceding verse in a succession, and press the right toggle button input 28D to display the next succeeding verse. This can be done as many times as desired to allow reviewing a succession of verses. After a time, by scrolling down using the 28B button or with pressing of a designated input 28A-E, e.g. center push button input 28E, a screen with several options will appear. For example, options can include: NEXT VERSE; PREVIOUS VERSE; ADD TO FAVORITES; ADD TO MEMORIZE; MAIN MENU; and >BACK<, as denoted in blocks 78 and 80. Referring to block 78 for example, SEARCH is selected. Following balloon F to FIG. 9, a list of subjects under the SEARCH menu will now appear, as denoted by block 82. The SEARCH function is a temporary subfunction of the device 22 that does not interfere with the previously set preset subject setting for feeding verses. As denoted in block 84, any of the subjects can be selected, here ASSURANCE OF SALVATION being selected for example. By entering this selection, a verse from that subject matter will be displayed, as illustrated in block 86. Again, if the user takes no action at this time, or if GO is selected, device 22 will simply automatically display the next verse from the selected subject at the prescribed time interval. However, by inputting another command, e.g., pressing push button input 28E, or using button 28B and scrolling down, or automatically after a predetermined time, device 22 can display an additional screen, as illustrated by block 88, for instance, including options: DONE; PREVIOUS VERSE; NEXT VERSE; ADD TO FAVORITES; ADD TO MEMORIZE; and >BACK<. By selecting ADD TO FAVORITES as illustrated, the verse will be saved under that category.

Figure 10:
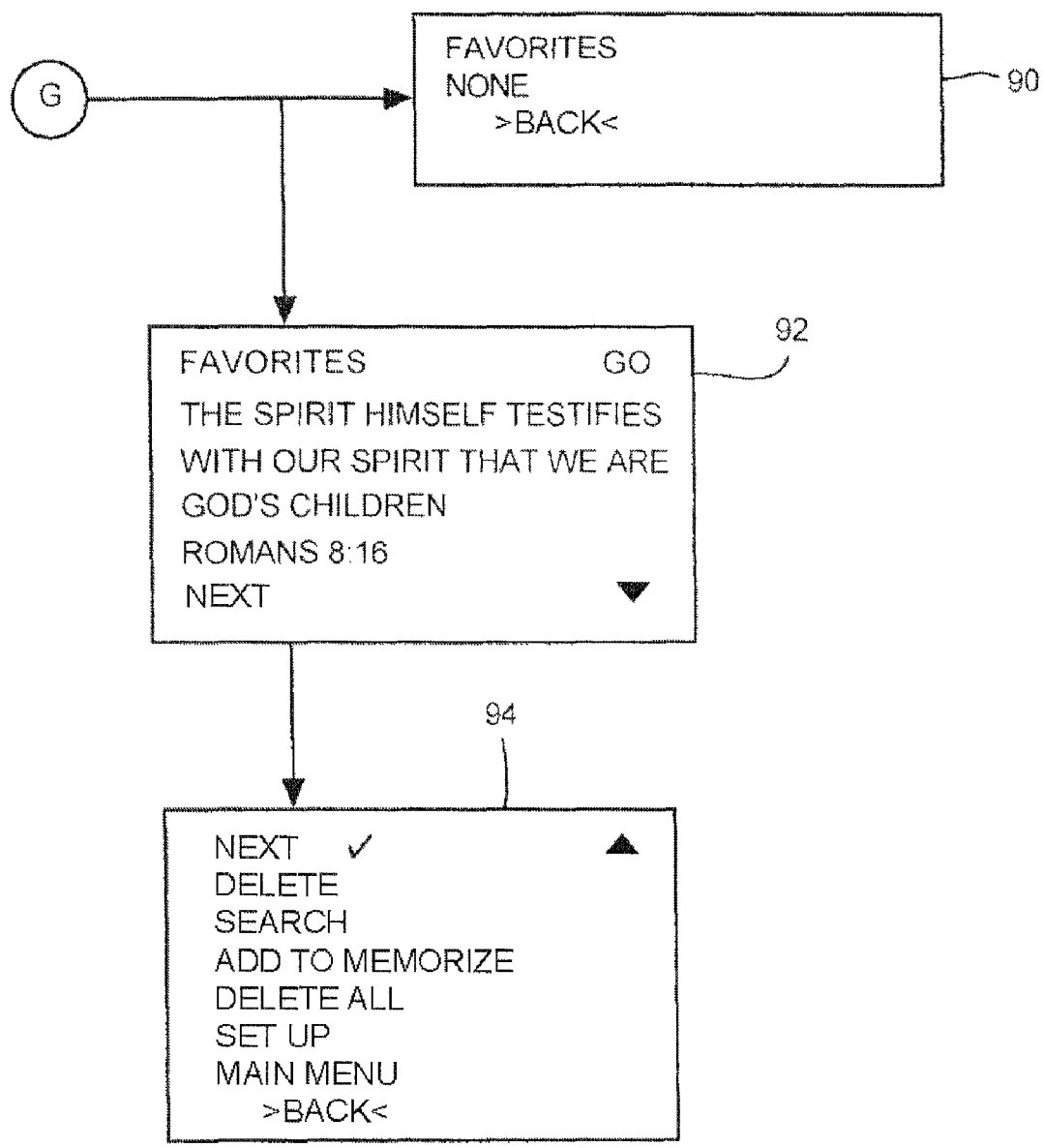
FIG. 10 is another portion of the flow diagram.

Following balloon G to FIG. 10, by holding down the center push button input 28E and returning to the MAIN MENU then by selecting FAVORITES from the displayed menu, a FAVORITES screen will appear. If there are none, the screen of block 90 will appear indicating that. If there are favorites, a screen like that of block 92 will appear, and additional options available in this mode will be displayed by pressing an appropriate input or automatically after an elapsed time: e.g., NEXT; DELETE; SEARCH; ADD TO MEMORIZE; DELETE ALL; SET UP; MAIN MENU; and >BACK< as denoted in block 94. For instance, if NEXT is selected, or no action is taken, the next verse of the favorites list will be displayed at the end of the prescribed time interval. If another option is selected, appropriate action will be automatically taken, e.g., delete the verse from favorites, go to the search screen, etc.

Figure 11:
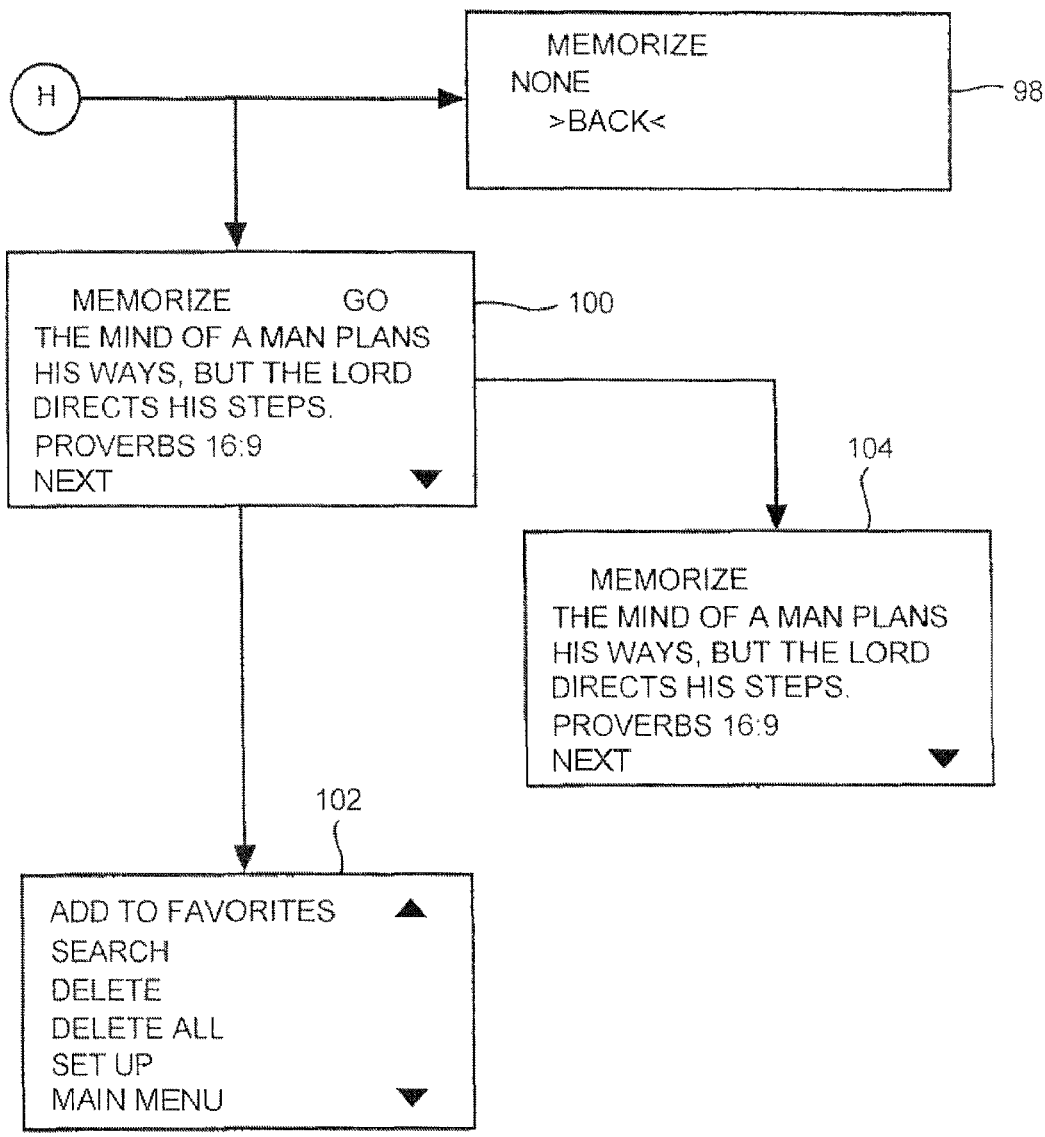
FIG. 11 is another portion of the flow diagram.

Following balloon H to FIG. 11, like in the case of the FAVORITES menu, MEMORIZE can be selected after ADD TO MEMORIZE, or from another menu. In this mode, if there are no verses to be memorized, the screen of block 98 will appear. If, however, there are verses contained in the MEMORIZE menu after MEMORIZE has been selected from the MAIN MENU then the screen of block 100 will appear. From this point the user must activate the feeding of the verse(s) within the MEMORIZE menu by selecting GO, which will reveal the screen of block 104. Again, with no further action, device 22 will automatically proceed to feed the next verse(s) of the MEMORIZE list at the prescribed time interval. Optionally, with an operator action, e.g., pressing one of the buttons of inputs 28A-E, additional screens can be displayed as illustrated by blocks 102 and 104, allowing desired action to be taken as described above.

As noted above, device 22, alone or in cooperation with a second device, can be configured and operable for evaluating user inputs responsive to the outputted data objects. As an example, after display of a data object, a question may be displayed to which an answer can be inputted, which can be for instance a simple true or false response, a multiple choice response, or the like. These responses can then be evaluated and information representative of aspects relating to the responses can be stored for download or other manner of analysis, or evaluated immediately for adaptively altering an operating parameter, such as the content, order, arrangement of the data object feeds. For instance, analysis indicating weakness in comprehension or memorization of a particular subject category or verse can trigger the more frequent feeding of data objects relating to that particular category, verse or verses to reinforce learning and comprehension thereof. If the responses are indicative of mastery or proficiency of a subject category, device 22 can be programmed to proceed to automatically display data objects of a second category. Alternatively, if the system is so configured, this function can be performed remotely by a second device, either automatically, or under control of a human operator such as an administrator or educator. This technique is particularly advantageous for subject matter of tests such as the SAT, ACT, and the like, where aptitude for, familiarity with, and mastery of, a particular subject category is to be measured or demonstrated, and which can be improved using tools such as provided by the system of the invention.

As another advantage of the system of the invention, using the MEMORIZE and FAVORITES functions discussed above, a user has the capability to select data objects of certain subject categories to be fed, e.g., certain verses. Those data objects selected for memorization can be fed in a selected order at desired or required intervals to facilitate that purpose. For example, as an extension or application of the MEMORIZE function, device 22 can be programmed such that those data objects selected for memorization can be automatically fed to a user either continuously, during a predetermined time period and/or at a particular time interval, or at a selectable time and/or time interval, which may be, for example, shorter than that, and/or at the end, of the normal feed, and/or include greater repetition of the data objects to be memorized. For instance, after a succession of data objects has been fed, the device 22 may be programmed to feed or administer a set of evaluation or testing data objects, for which responses are required, which responses will be evaluated by device 22, and/or stored and downloaded for evaluation remotely using a set up such as illustrated in FIG. 1, to obtain a measure of a desired parameter such as comprehension, or identify weak or problem areas. This function can be administered automatically, or by a human administrator such as an educator.

As another illustration of an advantage of the system of the invention, data objects selected for memorization or as favorites, either by the user in the above described manners, or remotely by an administrator, can be fed in a more rapid, repetitive manner, which may be advantageous for a particular user or subject category, or to demonstrate and evaluate proficiency or test taking skill.

As another advantage of the system of the invention, feedback of other metrics, e.g., time required for the user to select and input a correct response or responses to a data object or objects, which may be an indicator of comprehension, cognition speed, or other learning related parameters, can be outputted/downloaded and evaluated. Based on this feedback and evaluation, the data feed can be adaptively altered, with the objective of improving a desired metric or metrics, such as comprehension, correct answers, or test taking time, to improve performance, reduce user frustration or boredom, and other purposes. For instance, earlier fed data objects may be repeated, and/or diagnostic data objects, and/or remedial data objects, may be fed for review or to refresh the user's memory, or remediate, material deemed essential for comprehension of a particular subject category. Device 22 may be programmed to provide this capability, or the information can be downloaded via connection to a communications or computer network or other link to a second device which can be automatically controlled or under control of an administrator. This communications capability can be achieved in any desired commercially available manner adapted for the device in which the system is implemented, such as a cellular telephone, PDA, net book, etc.

As still another advantage, the FAVORITES function can be configured to compile and store a favorites list, which can comprise data objects to be fed at a desired time, either as a matter of course, or during a designated timer period, for any reason, e.g., sharing with a spouse or friend, or later reflection, review or emphasis. The FAVORITES function can also be configured to feed the data objects of the favorites in a random or different order.

In light of all the foregoing, it should thus be apparent to those skilled in the art that there has been shown and described electronic time data system and method according to the invention. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. An electronic time data system, comprising:
a programmable electronic data storage device including an output device and an input device, the electronic data storage device storing a set of individual data objects pertaining to a subject category, the electronic data storage device being programmed and configured to be in an inactive mode until activated by an input command, and when activated, to automatically successively output the individual data objects at time intervals of about 60 minutes or less, each of the outputted individual data objects being preceded or accompanied by an alert which can be turned off by a predetermined input command.

2. The system of claim 1, wherein the electronic data storage device is programmed to allow inputting of responses to the outputted data objects, and to automatically evaluate the inputted responses and adaptively alter which of the data objects will be subsequently outputted as a function of the inputted responses.

3. The system of claim 2, wherein the electronic data storage device is programmed such that when the inputted responses associated with the outputted data objects are indicative of comprehension thereof, the electronic data storage device will automatically output data objects of an additional subject category.

4. The system of claim 2, wherein the responses are predetermined and selectable by a user using the input device, and wherein some of the selectable responses are indicative of a lack of comprehension of the associated data objects.

5. The system of claim 4, wherein the electronic data storage device is programmed to record information representative of the responses selectable by the user.

6. The system of claim 1, wherein the electronic data storage device is programmed to automatically re-output previously outputted ones of the data objects when predetermined input commands are received.

7. The system of claim 1, wherein the electronic data storage device stores several of the sets of individual data objects pertaining to different subject categories, respectively, and is programmed to allow a user to select one of the subject categories for outputting of the data objects pertaining thereto.

8. The system of claim 1, wherein the time intervals are selectable by a user.

9. The system of claim 1, wherein the time intervals are remotely selectable by a second device.

10. The system of claim 1, wherein the time intervals are selected in a predetermined manner.

11. The system of claim 1, wherein the output device comprises a display device.

12. The system of claim 1, wherein the output device comprises an audio output device.

13. The system of claim 1, wherein the time intervals are 30 minutes or less.

14. A learning method, comprising steps of:
providing a programmed electronic data storage device including an input device and an output device and storing multiple individual data objects pertaining to at least one subject category, the electronic data storage device being programmed to be operable in an active mode to automatically output alerts at time intervals and to output the individual data objects;
receiving an input command with the electronic data storage device to initiate operation of the electronic data storage device in the active mode;
automatically outputting the alerts at selected time intervals;
receiving input commands with the electronic data storage device in response to the alerts;
in response to receiving the input commands in response to the alerts, ceasing the alerts and outputting the individual data objects.

15. The method of claim 14, wherein the electronic data storage device is programmed and configured to allow responses to the outputted data objects to be inputted, and the method comprises additional steps of:
receiving inputted responses to the outputted data objects; and
automatically evaluating the inputted responses and adaptively altering which of the individual data objects will be subsequently outputted as a function of the inputted responses.

16. The method of claim 15, further comprising a step of automatically re-outputting previously outputted ones of the data objects responsive to an input command received in response to an alert.

17. The method of claim 16, wherein the responses are predetermined and selectable using the input device, and wherein some of the selectable responses are indicative of a lack of comprehension of the associated data objects.

18. The method of claim 15, further comprising a step of automatically outputting individual data objects of a second subject category, after the inputted responses to the outputted data objects of the least one subject category are indicative of comprehension thereof.

19. The method of claim 15, further comprising a step of recording information representative of the inputted responses.

20. The method of claim 14, further comprising a step of prompting a selection of one of the subject categories for outputting by the electronic data storage device.

21. The method of claim 14, wherein the time intervals are selectable, the method further comprising a step of selecting the time intervals.

22. The method of claim 14, wherein the time intervals are selectable, the method further comprising a step of selecting the time intervals remotely by a second device.

23. The method of claim 14, wherein the output device comprises a display.

24. The method of claim 14, wherein the output device comprises an audio output.

25. The method of claim 14, wherein the time intervals are 30 minutes or less.

26. A learning method, comprising steps of:
providing a programmed electronic data storage device including an input device and an output device and storing multiple individual data objects pertaining to at least one learnable subject category, the electronic data storage device being programmed and configured to be operable in an active mode to automatically output alerts and the individual data objects and to respond to inputted commands;

receiving an input command with the electronic data storage device to initiate operation of the electronic data storage device in the active mode;

automatically outputting the alerts at selected time intervals of 60 minutes or less;

receiving input commands with the electronic data storage device in response to the alerts;

outputting the individual data objects during the time intervals;

receiving responses to the outputted data objects;

automatically evaluating the responses for indication of comprehension of the outputted data objects; and automatically re-outputting previously outputted ones of the data objects if the responses are indicative of a lack of comprehension.

27. The method of claim 26, comprising a further step of:
if the responses to the individual data objects are indicative of comprehension thereof, then outputting new data objects pertaining to a second subject matter category during the time intervals.

28. The method of claim 26, further comprising a step of recording information representative of the inputted responses.

* * * * *